US008004498B1

(12) United States Patent
Meridian (10) Patent No.: US 8,004,498 B1
(45) Date of Patent: Aug. 23, 2011

(54) SYSTEMS AND METHODS FOR MULTIPOINT TEMPORARY ANCHORING

(75) Inventor: Julie Meridian, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 926 days.

(21) Appl. No.: 11/876,132

(22) Filed: Oct. 22, 2007

(51) Int. Cl.
*G06F 3/041* (2006.01)

(52) U.S. Cl. ......................... 345/173; 345/156; 715/764

(58) Field of Classification Search .................. 345/156, 345/173–179; 715/700–702, 764, 788, 798, 715/800, 801, 863, 866; 178/18.01–18.09, 178/18.11, 19.01–19.06, 20.01
See application file for complete search history.

(56) References Cited

U.S. PATENT DOCUMENTS

| 7,676,767 | B2 * | 3/2010 | Hofmeister et al. | 715/863 |
| 2006/0001650 | A1 * | 1/2006 | Robbins et al. | 345/173 |
| 2006/0284874 | A1 * | 12/2006 | Wilson | 345/473 |

OTHER PUBLICATIONS

Igarashi, T. et al., "As-Rigid-As-Possible Shape Manipulation," ACM Transactions on Computer Graphics, vol. 24, No. 3, ACM SIGGRAPH 2005, Los Angels, USA, 2005.
Buxton, B., Multi-Touch Systems that I Have Known and Loved, Microsoft Research, web page available at http://www.billbuxton.com/multitouchOverview.html, as available via the Internet and printed Mar. 4, 2009.
Buxton, W. (1997). Living in Augmented Reality: Ubiquitous Media and Reactive Environments. In K. Finn, A. Sellen & S. Wilber (Eds.). Video Mediated Communication, 363-384.

* cited by examiner

*Primary Examiner* — Stephen G Sherman
(74) *Attorney, Agent, or Firm* — Kilpatrick Townsend & Stockton LLP (57) ABSTRACT

Systems, methods, and computer-readable media for multipoint temporary anchoring are described. One embodiment includes a method having the steps of receiving a first input signal associated with a first area of an object within a graphical workspace, automatically determining that the first input signal is a locking signal, selecting the first area of the object based at least in part on the first input signal, and automatically locking the first area of the object.

23 Claims, 6 Drawing Sheets

SYSTEMS AND METHODS FOR MULTIPOINT TEMPORARY ANCHORING

FIELD OF THE INVENTION

The present invention relates to graphics editing. The present invention more specifically relates to multipoint temporary anchoring.

BACKGROUND

Users of graphics editing programs, such as Adobe® Photoshop® or Adobe® Illustrator®, may anchor or secure one portion of a graphical object before editing another portion of the same graphical object. Conventional methods for anchoring or locking graphical objects typically involve a two step process. First, a user selects a portion of the graphical object to lock. Next, a user manually selects a locking tool to secure the selection or lock it in place. The two-step process for anchoring graphical objects can be time consuming and inefficient.

SUMMARY

Embodiments of the present invention comprise systems and methods for multipoint temporary anchoring. For example, one embodiment of the method comprises the steps of receiving a first input signal associated with an area of an object within a graphical workspace; automatically determining that the first input signal is a locking signal; selecting the area of the object based at least in part on the first input signal; and automatically locking the first area of the object. In another embodiment, a computer-readable media comprises code for a carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide methods, systems, and products for multipoint temporary anchoring. Methods, systems and products according to the present invention may be embodied in a number of ways. Certain embodiments of the present invention may, for example, reduce or eliminate inefficiencies in the graphical editing workflow. For example, one embodiment of the present invention may allow a user to select and automatically lock an area of a graphical object in one step, rather than performing the same actions in two or more steps.

Example of Multipoint Temporary Anchoring

In one illustrative embodiment of the present invention, a computer system running computer software for editing graphical objects displays a graphical workspace on a touch screen. In the embodiment, the graphical workspace is a work area within a graphical editing application, such as Adobe® Photoshop® or Adobe® Illustrator®. A graphical object is displayed within the graphical workspace. The graphical object comprises one or more objects visible on the touch screen display in communication with the computer system. A user editing the graphical object may desire to manipulate one area of the object after locking down a separate area of the object.

In one illustrative embodiment of the present invention, the user selects an area of the object within the graphical workspace, such as the head and torso of a fish. The user may touch an area of the graphical object with her palm, such as by covering the head and torso of the fish with the palm of her left hand, such that her palm covers most or all of the head and torso of the fish. The illustrative embodiment will then automatically select the area of the object corresponding with the area of contact of the user's hand, and simultaneously lock the selected area of the object. In other words, the head and torso of the fish are selected and locked, and they will not move when other portions of the fish are manipulated.

Next, the user may use her right hand, or a different input device, to manipulate a second area of the object. For example, the user may select the tail of the fish with a stylus, and drag the tail of the fish upward. The user may then release her left hand from the touch screen display, and contact another portion of the display to manipulate that area. Finally, when the user is done manipulating the second area of the object, she removes both hands, and the embodiment automatically unlocks the locked area of the object.

Alternatively, a single type of input may be used to select and lock one area of a graphical object, and to subsequently manipulate another area. For example, a user may contact and hold her hand down on a touch screen display for a set period of time, such as 3 seconds. The prolonged selection may cause the selected area to be automatically locked. The user can then manipulate the unlocked portion of the graphical object and then unlock the selection when she has completed the manipulation.

These examples are given to introduce the reader to the general subject matter discussed herein. The invention is not limited to these examples. Further details regarding various embodiments of products and methods for interactive video frame selection are described below.

Illustrative System for Multipoint Temporary Anchoring

Figure 1:
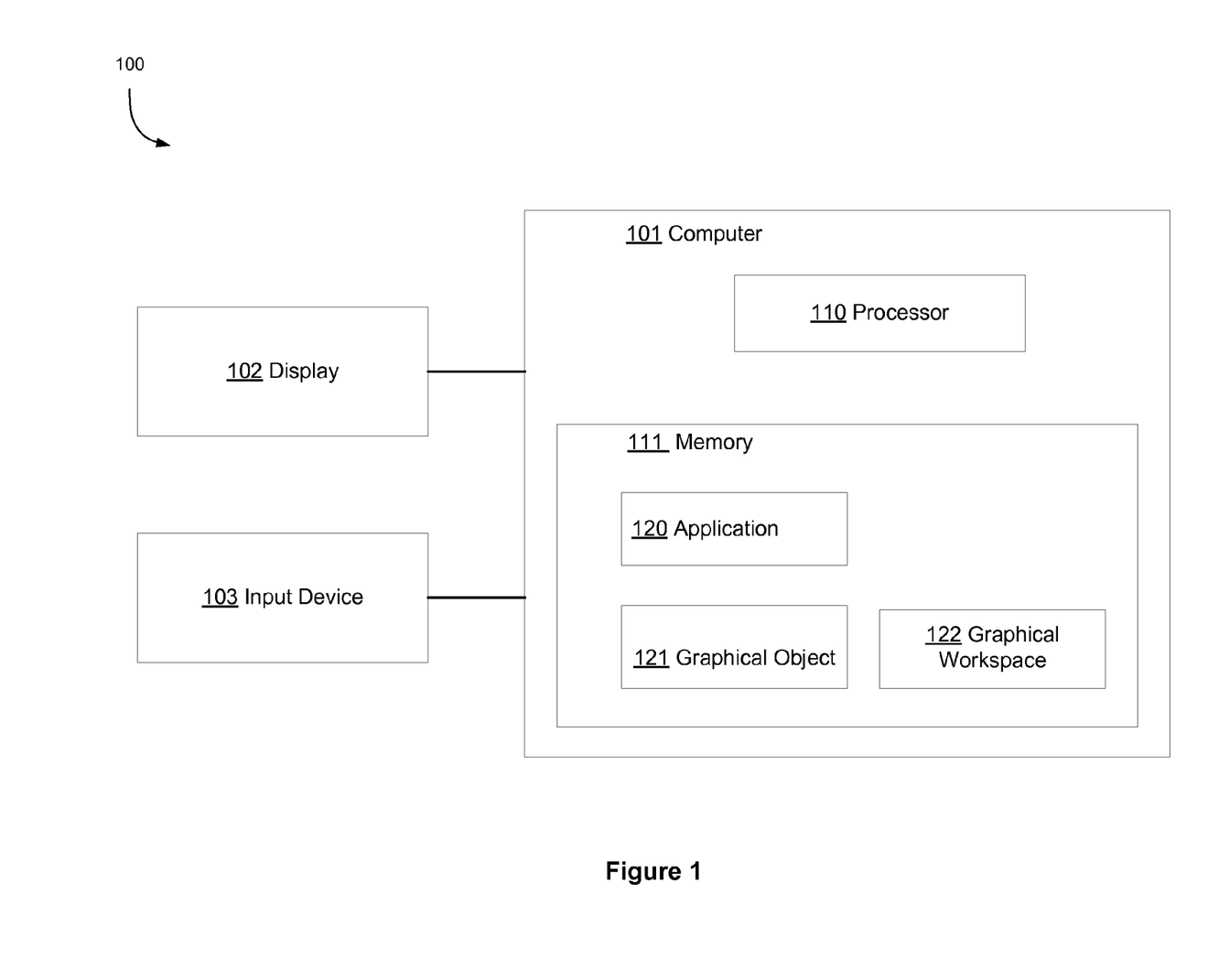
FIG. 1 is a block diagram illustrating a system for multipoint temporary anchoring according to one embodiment of the present invention.

Referring now to the drawings in which like numerals refer to like elements throughout the several figures, FIG. 1 is a block diagram illustrating a system for multipoint temporary anchoring according to one embodiment of the present invention. System 100 comprises a computer 101 in communication with a display 102 and in communication with an input device 103. Examples of a computer 101 are personal computers, digital assistants, personal digital assistants, cellular phones, mobile phones, smart phones, pagers, digital tablets, laptop computers, Internet appliances, and other processor-based devices. In general, a computer 101 may be any type of processor-based platform that operates on any operating system, such as Microsoft® Windows® or Linux, capable of supporting one or more applications 120. One or more applications 120 may be stored in memory 111 and may comprise, for example, a graphics editor, a video game, a media player application, a presentation application, an Internet browser application, a rich Internet application, and any other application or computer program capable of being executed by a processor 110.

Input device 103 may be configured to generate input signals and provide the input signals to the computer 101. For example, a touch sensitive input device 103, such as a touchpad, may recognize that a user has contacted its surface with her palm and generate an input signal. The input signal may be a digital or analog signal transferred over a wired or wireless connection to the computer 101. FIG. 1 illustrates one input device 103 in communication with the computer 101. In certain other embodiments, the system 100 may comprise one or more input devices 103 in communication with the computer 101.

Input device 103 may be a touch sensitive input device, such as a touchpad or a Wacom® touch sensitive tablet. Input device 103 may be a multi-touch input device. Some conventional touchpads may only recognize a single contact point. A multi-touch device, on the other hand, can recognize multiple contact points, that is, multiple simultaneous inputs. For example, input device 103 may be a touchpad configured to recognize two simultaneous input signals, such as a user simultaneously placing her palm and a stylus on the touchpad surface, or a user engaging the input device 103 with ten fingertips at once. Other examples of input devices 103 may include a mouse, joystick, or a keyboard. A touch sensitive input device 103 may detect one or more contacts through various methods, such as through capacitance sensors, pressure sensors, or one or more video cameras.

In the embodiment shown, display 102 and input device 103 are distinct. The system 100 may comprise a mouse input device 103 in one housing and a liquid crystal diode (LCD) display 102 in a separate housing. In certain other embodiments, the display 102, the input device 103, and the computer 101 may be housed in a single housing, such as a desktop computer, a table-top surface device, or a personal media player. Examples of a system 100 comprising a computer 101, display 102, and input device 103 in a single housing include Microsoft® Surface™, the JazzMutant Lemur, or the Apple® iPod™ touch.

The input device 103 may have a direct mapping or isomorphic relationship with the graphical workspace 122 shown on the display 102. For example, distinct areas of a touchpad device 103 may directly correspond to areas in the graphical workspace. In such an example, a user may select an area of a graphical object displayed at the bottom of a graphical workspace by touching the bottom of the touchpad.

Computer 101 comprises a processor 110 and a computer-readable medium, such as memory 111, and is in communication with the display device 102 and the input device 103. Memory 111 comprises an application 120, a graphical workspace 122, and a graphical object 121. The application 120 receives input signals from the input device 103 and causes changes to the graphical object 121 or to the graphical workspace 122. For example, the application 120 may cause the graphical object 121 to be displayed within the graphical workspace 122 on the display device 102. Processor 101 executes application 120 to allow the user to edit the graphical object 121 within the graphical workspace 122. Application 120 may be a graphical editing application, such as Adobe® Photoshop® or Adobe® Illustrator®. The graphical workspace 122 may be a work area within the graphical editing application, which may include one or more layers. In one embodiment, the user manipulates a graphical object 121 on a layer within the graphical workspace 122 of the graphical editing application.

The graphical object 121 may be identifiable and distinct. For example, the graphical workspace 122 may be empty apart from the graphical object 121. In another example, the graphical workspace 122 may comprise multiple graphical objects 121. Application 120 may be able to separate and distinguish multiple graphical objects 121 displayed in the graphical workspace. A first graphical object 121 may be associated with a first layer, and a second graphical object may be associated with a second layer.

A graphical workspace 122 may contain several graphical objects, such as three trees. Application 120 may be able to distinguish each graphical object 121 and edit each graphical object 121 separately, for example, by making one tree taller. Alternatively, application 120 may be able to edit multiple graphical objects 121 at the same time, such as by simultaneously changing the color of each tree from green to red.

The graphical object 121 may consist of one or more areas. As one example, a graphical object 121 representing an animal may have areas such as a head, torso, and limbs. As the application 120 edits the graphical object 121, it may create, update, manipulate, or destroy all of part of a graphical object 121. For example, the application 120 may stretch and enlarge the entire graphical object 121. Alternatively, the application 120 may manipulate only certain portions or areas of the graphical object 121, such as stretching the tail, or shrinking the head of a graphical object.

The graphical object 121 may comprise one object in a picture displayed in the graphical workspace 122. For example, the graphical object 121 may comprise a skyscraper in an urban skyline image displayed in the graphical workspace. Graphical object 121 may also comprise a persistent object in a video file, such as a shark that swims from left to right during playback of a video file. When a user edits a persistent object in one video frame, the changes may be applied across every video frame in which the object appears.

Illustrative Methods for Multipoint Temporary Anchoring

Figure 2:
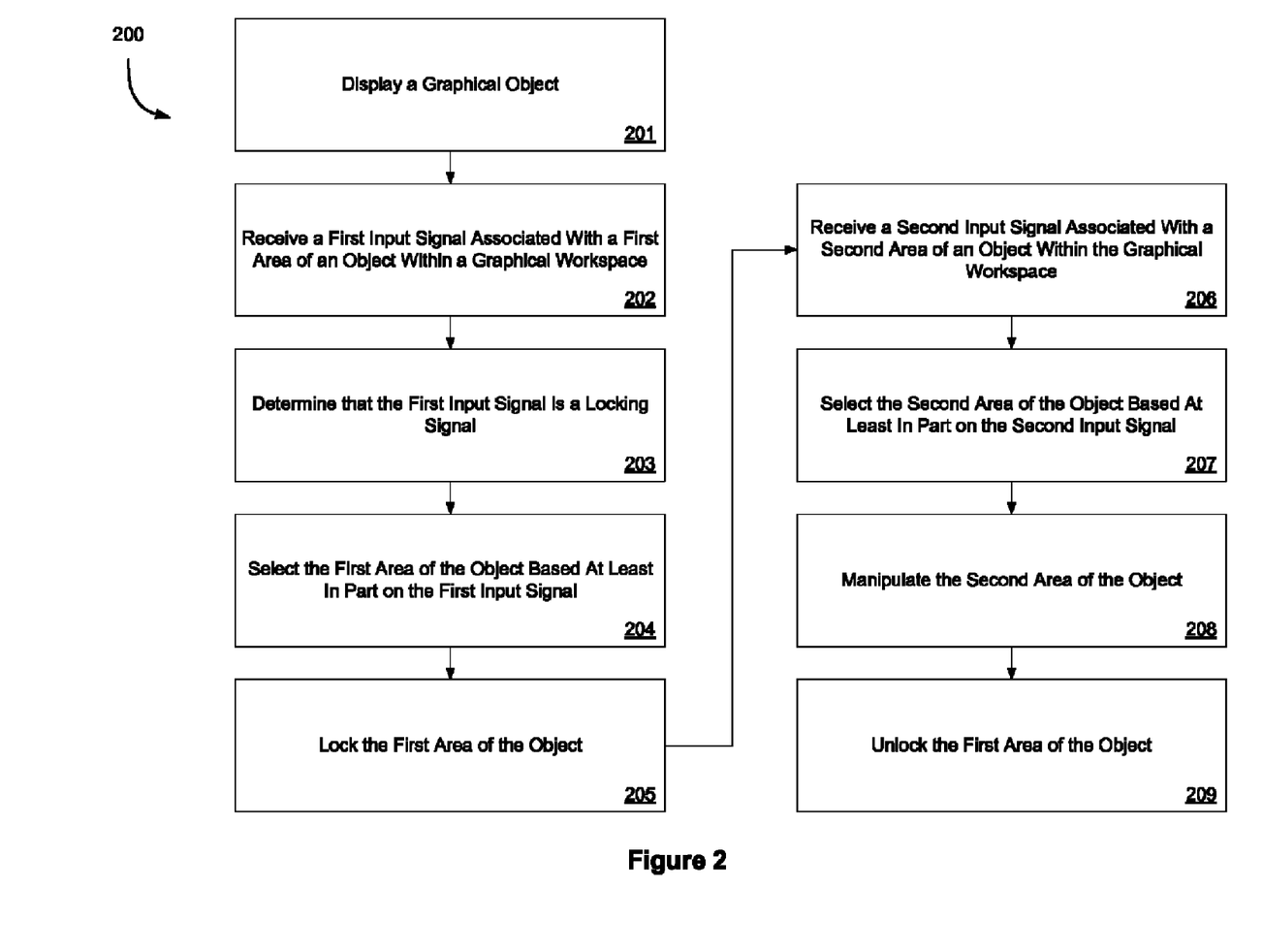
FIG. 2 is a flow chart illustrating a first method for multipoint temporary anchoring according to one embodiment of the present invention.
Figure 4:
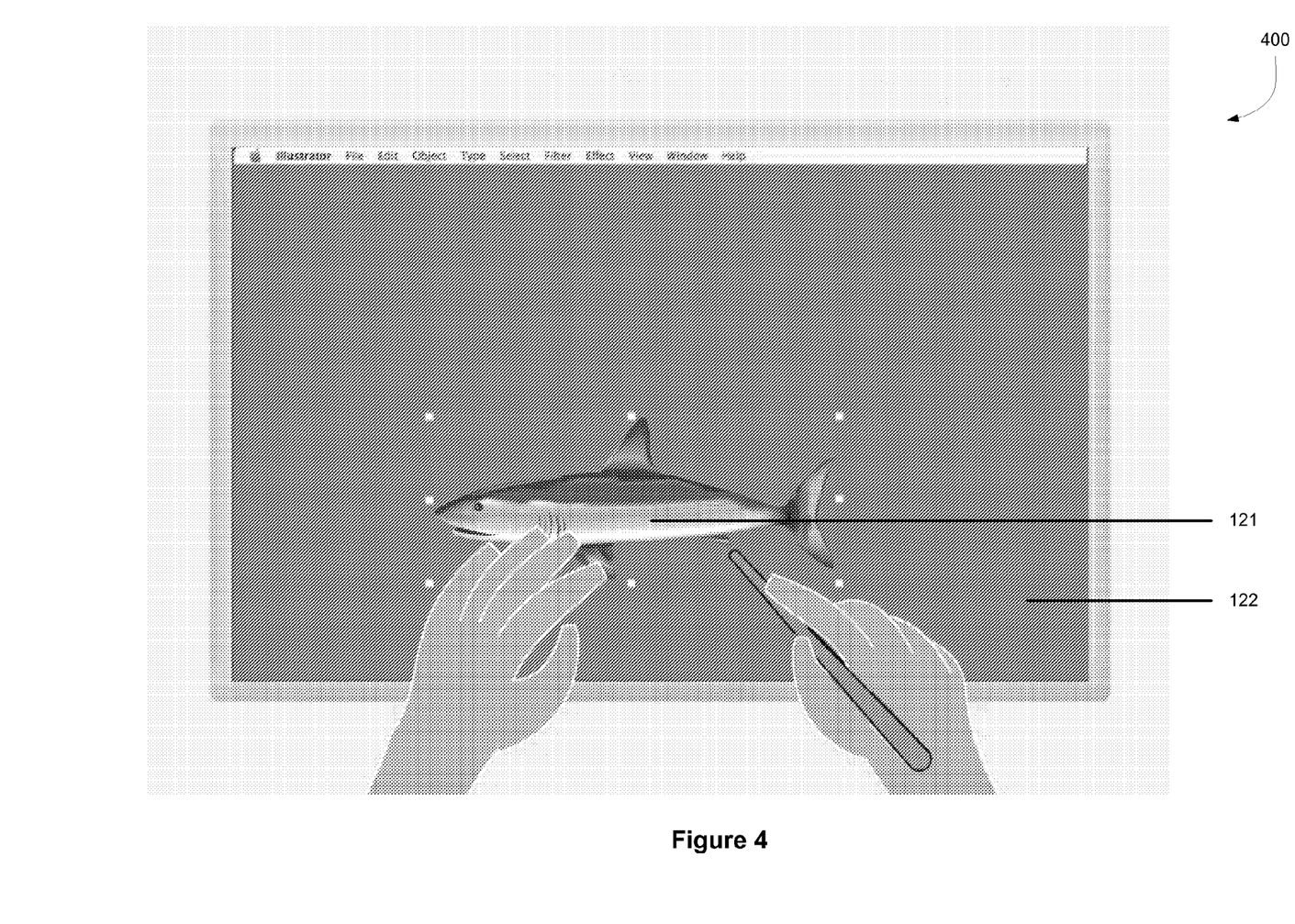
FIGS. 4-6 are screen shots illustrating an application according to one embodiment of the present invention.
Figure 5:
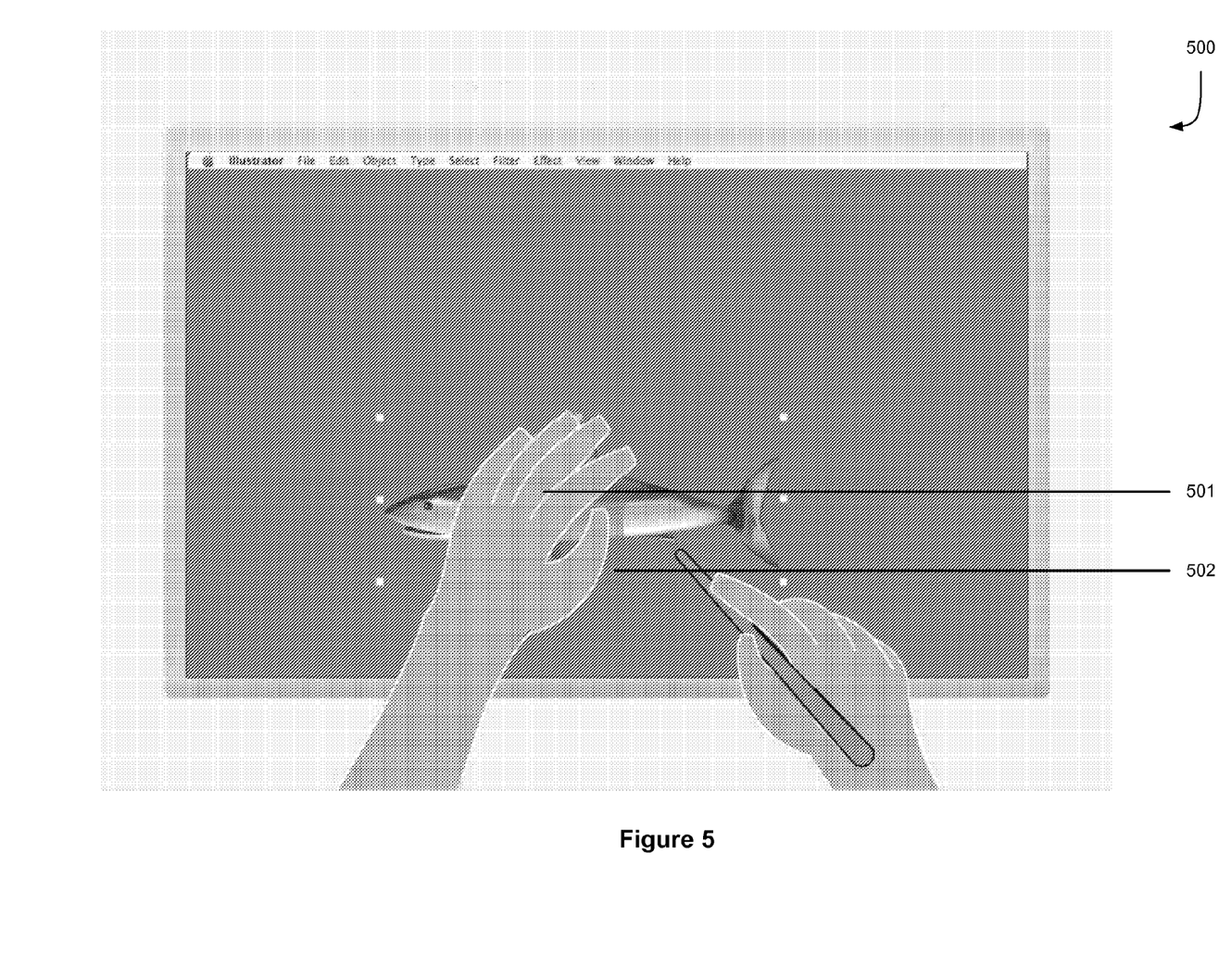
Figure 6:
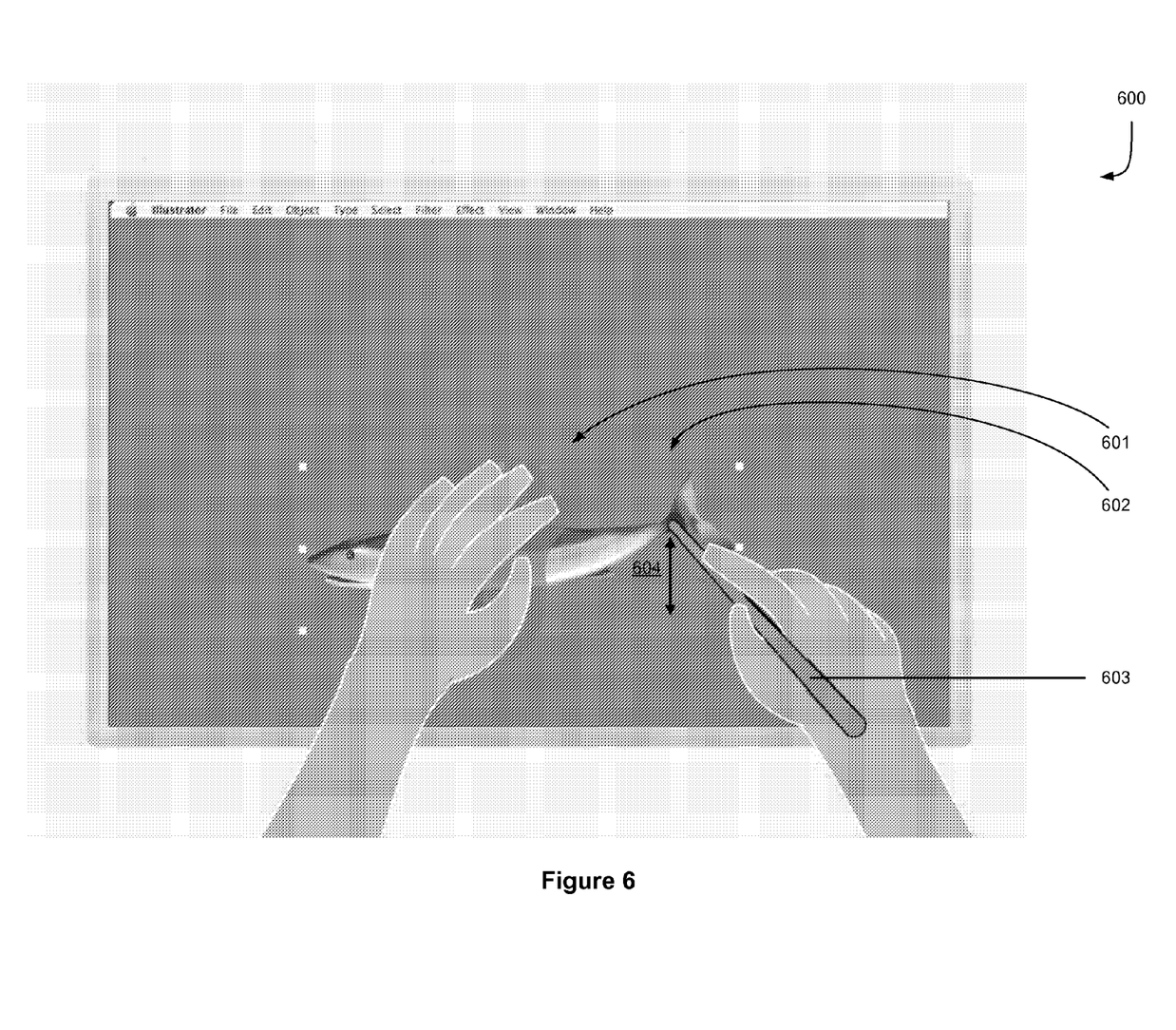

Further embodiments of the present invention will be described in detail below with respect to FIGS. 2-6. FIG. 2 is a flow chart illustrating a first method 200 for multipoint temporary anchoring according to one embodiment of the present invention. FIGS. 4-6 are screen shots illustrating an application according to one embodiment of the present invention. The method 200 shown in FIG. 2 will be discussed with reference to the system 100 shown in FIG. 1 and the screen shots in FIGS. 4-6.

The method 200 begins in block 201, where the system 100 displays a graphical object 121. For example, a user may execute a graphical editing application 120 on the computer 101 to display the graphical object 121 on the display 102. The graphical editing application 120 loads the graphical object 121 from storage, such as from a disk drive, into memory 111. The computer 101 then displays all of part of the graphical object 121 on the display device 102.

In the embodiment shown in FIG. 4, a first screen shot 400 illustrating an application according to one embodiment of the present invention is shown. The first screen shot 400 comprises a graphical editing application 120. The graphical editing application 120 may display one or more graphical objects 121 within a graphical workspace 122. As shown in FIG. 4, graphical object 121 is a graphic of a shark displayed within the graphical editing workspace 122. The application 120 illustrated in screen shots 400, 500, and 600 of FIGS. 4-6 is displayed on a touch sensitive input display such as a touch screen.

In block 202, the system 100 receives a first input signal associated with an area of a graphical object 121 within the graphical workspace 122. The user may employ an input device 103, such as a mouse, touch screen, or other device, to select an area within the graphical workspace 122.

The input signal may comprise one or more points of contact made on the input device 103. For example, as illustrated in FIG. 5 in screen shot 500, the input device 103 may detect contact from a user's hand 501. Contact from a user's hand may result in a plurality of discrete points of input. The user's hand contacting the touch screen may specifically result in points of input near each of the user's fingertips and/or near the heel or palm of the hand.

When the user touches the touch screen, the system 100 may be configured to determine a selection area based at least in part on the plurality of discrete points of contact. The system 100 may determine the selection area by connecting the discrete contact points, such as a user's fingertips. The system 100 may connect each discrete point of contact with a straight line, in a polygonal manner, or through smoothed lines that may approximate the user's intended area of contact. The selected area 502 defined by such a boundary may be indicated by a shadow, and approximate the boundaries of discrete points of contact.

In block 203, the system 100 determines that the first input signal is a locking signal. The system 100 may automatically determine that the first input signal is a locking signal. In other words, the system 100 may determine that the first input signal is a locking signal without user intervention. A locking signal, or an anchoring signal, may indicate that a user wants a graphical object, or an area of a graphical object, to remain static, while another portion of the graphical object changes.

The system 100 may automatically determine that the first input signal is a locking signal based on a variety of factors. For example, the system 100 may determine that the first input signal is a locking signal based at least in part on a second input signal. The system 100 may determine the locking signal based on when the input signals are received. When a system 100 receives two input signals in succession, the system 100 may determine that the first input signal is a locking signal.

The system 100 may also determine that the first input signal is a locking signal based at least in part on the duration of the input signal. The system 100 may lock an area of the object while the first input signal is being received, or for the duration of the first input signal. For example, a user may intuitively seek to lock an area by holding down her palm on the area. In one embodiment, if the system 100 detects that a user has held her palm down on an area for longer than 2 seconds, the system 100 determines that the user intends to lock the area enclosed by the palm. In certain other embodiments, the system 100 may automatically determine that the first input is a locking signal after a longer or shorter period of time.

The system 100 may determine that the first input signal is a locking signal based at least in part on the input device 103 associated with the first input signal. An input device such as a stylus or pen may have different physical or electrical properties unlike a finger or hand. The system 100 may be configured to differentiate between different types of input based on these or other characteristics. In one embodiment, if the system 100 detects that an input signal is associated with a pen or wand, than the system 100 automatically determines that the input signal is not a locking signal. Conversely, if the system 100 detects that an input signal is associated with a hand, then the system 100 automatically determines that the input signal is a locking signal.

The input device 103 may be configured to detect multiple levels of pressure. The system 100 may determine that the first input signal is a locking signal based at least in part on the amount of pressure put on a touch sensitive input device. In other embodiments, the system 100 may determine that the first input signal is a locking signal based on the size of an input signal. If a user contacts a touch screen at a small point, the system 100 may determine that the input signal is not a locking signal. Alternatively, if the user contacts the touch screen over a large area, the system may determine that the input signal is a locking signal.

In some embodiments, the system 100 may be configured to provide feedback to indicate to a user that the system 100 has determined that an input signal associated with a user's interaction is a locking signal. For example, in certain embodiments, if the system 100 determines that an input signal is a locking signal, the system 100 may vibrate the touchpad to provide haptic feedback to the user, highlight or otherwise emphasize the first area within the graphical workspace to provide visual feedback to the user, cause an audio output to provide aural feedback, or otherwise provide some indication to the user that an area has been selected.

In block 204, the system 100 selects the first area of the object based at least in part on the first input signal. As one example, the system 100 selects the area of the object covered by a user's palm. As another example, the system 100 may select the area of an object designated by the movement of a mouse cursor. The system 100 may cause the selected area to be highlighted, shadowed, or otherwise visually indicate that the area has been selected.

The system 100 may also select the first area of the object based at least in part on a selection area. If the system 100 receives multiple input points, which together are determined to be a locking signal, the system 100 may then determine a selection area based on the multiple input points.

In block 205, the system 100 automatically locks the first area of the object. The purpose of locking an area may be to ensure that the locked area is not being interacted with or will not change. The user is then free to manipulate other areas of the object without changing the locked area. The system 100 may lock the first area of the object without user intervention. In other words, the system 100 may automatically lock the first area of the object. The system 100 may discolor or otherwise indicate that an area has been locked. For example, the system 100 may overlay a translucent shadow over the locked area, or draw a dotted line around the locked area.

In block 206, the system 100 receives a second input signal associated with a second area within the graphical workspace. The system may receive the second input signal simultaneously with the first input signal, or immediately after receiving the first input signal. In one example, a user will put his hand down on the area to be locked, and immediately engage the area to be manipulated with a stylus. In other embodiments, the system 100 does not receive the second input signal simultaneously with the first input signal. The system 100 may lock the first area and wait for the user to perform a second action.

In another example, the second input signal may follow sequentially after steps 201, 202, 203, 204, and 205. The user selects an area to be locked with a mouse, specifically by dragging a cursor around all or part of the area, while keeping the mouse button depressed. After a predetermined period of time, such as 3 seconds, the system 100 automatically selects and locks the area. Next, the user releases the mouse button, and makes a second selection of an area to be manipulated with the same mouse.

In block 207, the system 100 selects the second area of the object based at least in part on the second input signal. The user may select the second area by contacting the input device with her palm, dragging a stylus over the second area, or clicking on the area with a mouse cursor. The second area selected by the system 100 may be the entire unlocked area of the object. In one example, a user locks the head of a graphical object. Next, if a user clicks on another area of the graphical object, the system 100 automatically selects the entire unlocked area of the graphical object. Alternatively, the system 100 may only select the second area based on the exact point or area contacted by a user. If a user locks the torso of a graphical object, and then selects an elbow, the system 100 may only select the elbow to manipulate, as opposed to selecting the entire arm.

In block 208, the system 100 manipulates the second area of the object. For example, the user may drag a stylus in a particular direction, which causes the system 100 to move the second area in the direction.

In block 209, the system 100 unlocks or releases the first area of the object. Unlocking the first area may also comprise deselecting the first area. The first area may be automatically or manually unlocked. In certain embodiments, the system 100 may receive an unlock signal. For example, the user may make a certain gesture with the input device, such as a "q" gesture or an "R" gesture, indicative of a quit signal or a release signal. Upon receiving the release signal, the system 100 unlocks the first object. If the user locked the first area and later lifted her hand from the area while it remained locked, the user may unlock the area by touching it again.

The first area may be automatically unlocked after the second area is manipulated. In one embodiment, the system 100 determines that a user has ended or finished a manipulation of a second area, and unlocks the first area after the finished manipulation. The user may manipulate a second area by dragging a stylus or a mouse. When the user releases the mouse button or lifts the stylus, the system 100 may determine that the user has finished the manipulation of the second area, and subsequently unlock the first area. Or, the system 100 may automatically unlock the first area after waiting several seconds for an input signal. For example, a user may stop manipulating a second area for 2 or 3 seconds. After this pause, the system 100 automatically unlocks the first area.

Figure 3:
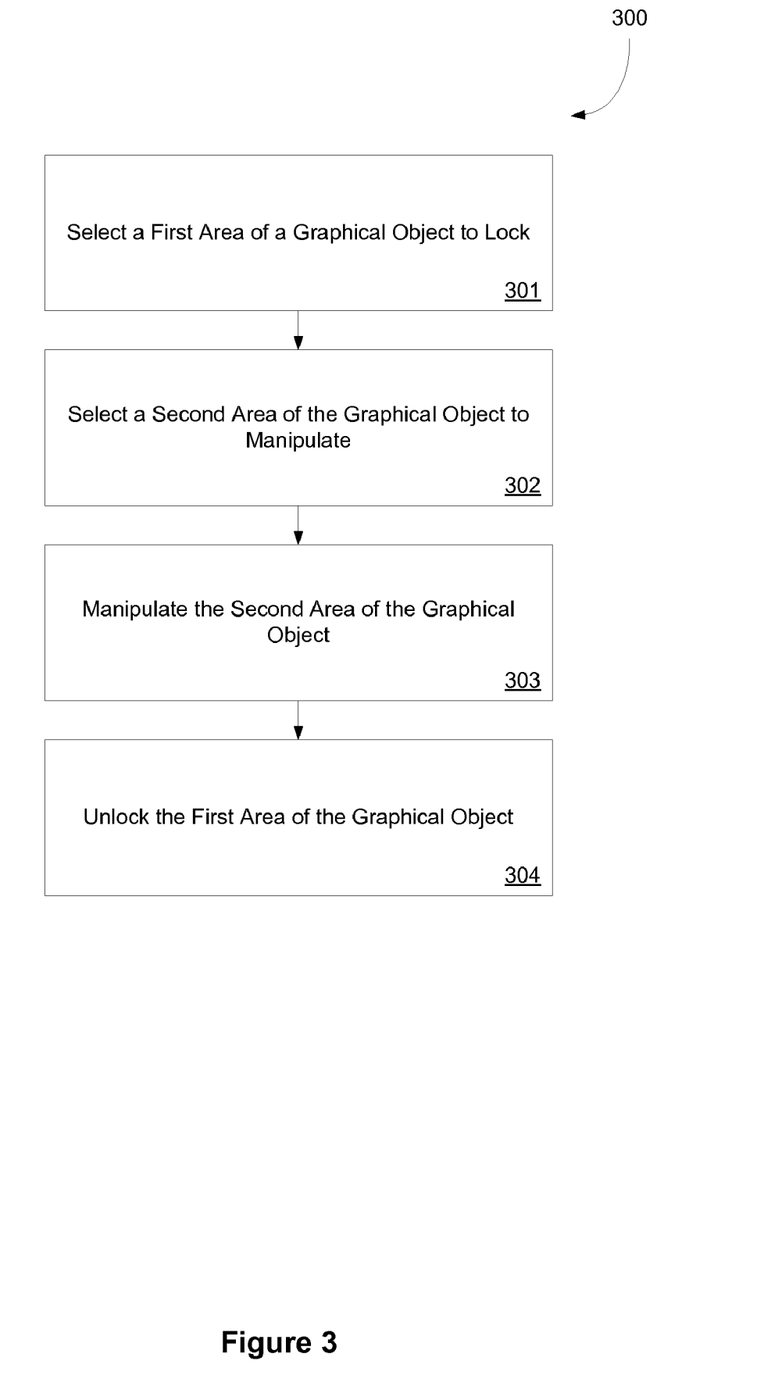
FIG. 3 is a flow chart illustrating a second method for multipoint temporary anchoring according to one embodiment of the present invention.

FIG. 3 is a flow chart illustrating a second method 300 for multipoint temporary anchoring according to one embodiment of the present invention. The method 300 shown in FIG. 3 will also be discussed with reference to the system 100 shown in FIG. 1 and the screen shots in FIGS. 4-6.

Method 300 begins with block 301, selecting a first area of a graphical object to lock. As illustrated in FIGS. 4-6, the user selected a torso of the graphical object to lock. By detecting that the user is holding down her palm 501 on the touch sensitive input surface, the system 100 may automatically determine that the first input signal is a locking signal based on the duration of the input signal. Alternatively, the system 100 may determine that the first input signal is a locking signal based on the type of input utilized by the user, in this case, hand contact.

In block 302, the user selects a second area of the graphical object to manipulate. As shown in FIG. 6, the torso area 601 of the graphical object is selected and locked with one input, while a second input selects the tail area 602 of the graphical object to manipulate.

In block 303, the user manipulates the second area of the graphical object. For example, the user may drag a stylus device 603 in the directions shown 604. While the user drags the second selection 602 up and down, the first selection 601 remains locked and does not change. By locking certain areas 601 of the graphical object and manipulating other areas 602, users of the present invention may quickly and easily model complex events, such as a shark swimming in open water.

Finally, in block 304, the first area of the graphical object is deselected. In some embodiments, the first area of the graphical object may remain locked during subsequent manipulations of one or more areas of a graphical object. For example, the fish's torso may remain locked while a user manipulates the fish tail and then the fish head. In the example, when all manipulations are complete, an unlocking gesture, such as a double-tap on a touch screen, may cause the system 100 to unlock the first area.

An advantage of the multipoint temporary anchoring approach is that it enables more intuitive and user-friendly editing of graphical objects. A user may select and lock an area of a graphical object in one step. In contrast, conventional methods may force a user to perform the same action in two steps: first selecting the area to be locked, and second manually locking the area.

One particular, advantage of embodiments of the present invention over the prior art is that an input signal may be determined to be a locking signal based on various criteria. For example, one embodiment may determine that the first input signal received is a locking signal and the second input signal received is a manipulation signal based on their chronological order. As another example, one embodiment may determine that an input signal is a locking signal based on the input signal's duration. If a user maintains contact with a touch pad for several seconds, such contact may automatically be determined to be a locking signal. In contrast, conventional methods may not distinguish between multiple input signals. In a third example, certain embodiments may determine that an input signal is a locking signal based on the type of input used. Conventional methods of locking graphical objects may rely on the additional, manual step of indicating that the selected area should be locked before a different area is manipulated.

Some conventional methods may only manipulate graphical objects based on discrete input points. Any action that is made may be relative to the defined points. In contrast, an advantage of the current method is that a user may define an area rather than a single point of input.

Referring again to FIG. 1, embodiments of the present invention can be implemented in digital electronic circuitry, computer hardware, firmware, software, or in combinations of them.

In one embodiment, a computer 101 comprises a processor 110 or processors. The processor 110 comprises or is in communication with a computer-readable medium, such as a random access memory (RAM) coupled to the processor. The processor 110 executes computer-executable program instructions stored in memory 111, such as executing one or more computer programs or applications 120 for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various transmission devices or channels, such as a router, private or public network, may comprise other forms of computer-readable media to facilitate transmitting or carrying instructions to a computer. The processor, and the processing, described may occur in one or more structures, and may be dispersed through one or more structures. The processor may comprise code for carrying out one or more of the methods (or parts of methods) described herein.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A method, comprising:
    receiving, by a processor, a first input signal associated with a first area of an object within a graphical workspace;
    automatically determining, by the processor, that the first input signal is a locking signal;
    selecting, by the processor, the first area of the object based at least in part on the first input signal; and
    automatically locking the first area of the object by the processor before receipt of a second input signal associated with a second area of the object so that the first area of the object remains static while the second area of the object is subsequently manipulated in response to the second input signal.

2. The method of claim 1, wherein the first input signal is received from a touch sensitive input device.

3. The method of claim 2, wherein the touch sensitive input device comprises a touch screen configured to detect multiple areas of simultaneous contact.

4. The method of claim 1, wherein the first input signal comprises a plurality of discrete points of input.

5. The method of claim 4, further comprising determining a selection area based at least in part on the plurality of discrete points of input and wherein selecting the first area of the object is also based at least in part on the selection area.

6. The method of claim 1, further comprising unlocking the first area.

7. The method of claim 6, further comprising receiving an unlock signal; and wherein unlocking the first area is based at least in part on the unlock signal.

8. The method of claim 1, further comprising automatically unlocking the first area after the second area is manipulated.

9. The method of claim 1, wherein automatically determining that the first signal is a locking signal is based at least in part on the duration of the first signal.

10. The method of claim 1, wherein automatically determining that the first signal is a locking signal is based at least in part on an input device associated with the first input signal.

11. The method of claim 1, further comprising:
    receiving the second input signal associated with the second area of the object within the graphical workspace;
    determining that the second input signal is a manipulation signal; and
    manipulating the second area of the object based at least in part on the manipulation signal,
    wherein the first area of the object remains static while the second area of the object is manipulated.

12. The method of claim 11, wherein
    the first input signal is associated with a first point of contact with a touch sensitive input device; and
    the second input signal is associated with a second point of contact with a touch sensitive input device.

13. The method of claim 11, wherein
    the first input signal is generated by detecting a substantially planar input on a touch sensitive input device; and
    the second input signal is generated by detecting a stylus input on the touch sensitive input device.

14. A method, comprising
    receiving, by a computing device, a first input signal associated with a first area of an object within a graphical workspace;
    determining, by the computing device, that the first input signal is a locking signal without user intervention and before receipt of a second input signal associated with a second area of the object;
    selecting, by the computing device the first area of the object based at least in part on the first input signal; and
    locking, by the computing device, the first area of the object so that while the second area of the object is subsequently manipulated in response to the second input signal, the first area of the object remains static.

15. A method, comprising:
    receiving, at a computing device, a first input from a touch screen, the first input associated with a first area of an object within a graphical workspace;
    locking, by the computing device, the first area of the object while the first input is being received to define a locked first area of the object;
    after locking the first area of the object, receiving, by the computing device, a second input from the touch screen, the second input associated with a second area of the object within the graphical workspace which is not locked; and
    editing, by the computing device, the object by changing the second area in response to the second input, the locked first area of the object remaining unchanged during editing.

16. A nontransitory computer-readable medium on which is encoded program code, the program code comprising:
    program code for receiving a first input signal associated with a first area of an object within a graphical workspace;
    program code for automatically determining that the first input signal is a locking signal prior to receipt of a second input signal associated with a second area of the object;

program code for selecting the first area of the object based at least in part on the first input signal; and program code for automatically locking the first area of the object so that the first area of the object will remain static while the second area of the object is changed in response to the second input signal.

17. The computer-readable medium of claim 16, further comprising program code for determining that a plurality of discrete points of input are associated with a first area of an object within a graphical workspace.

18. The computer-readable medium of claim 16, further comprising program code for unlocking the first area.

19. The computer-readable medium of claim 16, further comprising program code for determining an end of a manipulation of a second area.

20. The computer-readable medium of claim 16, further comprising program code for receiving an unlock signal.

21. The computer-readable medium of claim 16, further comprising:

program code for receiving the second input signal associated with the second area of the object within the graphical workspace;

program code for determining that the second input signal is a manipulation signal; and program code for manipulating the second area of the object based at least in part on the manipulation signal.

22. The computer-readable medium of claim 16, wherein program code for automatically locking the first area of the object comprises code for storing data so that, when a second area of the object is manipulated in response to further input, the first area of the object remains static while the second area of the object is changed.

23. A system, comprising:

a processor configured to:

receive a first input signal associated with a first area of an object within a graphical workspace;

automatically determine that the first input signal is a locking signal;

select the first area of the object based at least in part on the first input signal; and automatically lock the first area of the object before receipt of a second input signal associated with a second area of the object.

* * * * *